United States Patent [19]

Sironi

[11] Patent Number: 4,859,068
[45] Date of Patent: Aug. 22, 1989

[54] SCREW TYPE EXTRUDER WITH FLOW CHAMBERS EXTERNALLY AND INTERNALLY OF SCREW

[75] Inventor: Giovanni Sironi, Osnago, Italy

[73] Assignee: Societa' Cavi Pirelli S.p.A., Milan, Italy

[21] Appl. No.: 209,229

[22] Filed: Jun. 20, 1988

[30] Foreign Application Priority Data

Jun. 30, 1987 [IT] Italy ................. 21106 A/87

[51] Int. Cl.⁴ ............................. B29C 47/04
[52] U.S. Cl. ............................. 366/76; 366/79; 425/130; 425/131.1; 425/133.1; 425/382 R
[58] Field of Search ............. 425/130, 131.1, 133.1, 425/133.5, 382 R, 207; 366/76, 79

[56] References Cited

U.S. PATENT DOCUMENTS 3,999,921 12/1976 Thor et al. .................... 366/79
4,094,946 6/1978 Finkensiep et al. ............. 425/131.1

Primary Examiner—Jay H. Woo
Assistant Examiner—Timothy W. Heitbrink
Attorney, Agent, or Firm—Brooks Haidt Haffner & Delahunty

[57] ABSTRACT

A screw type, polymeric material extruder with an elongated body having a cylindrical bore with a hollow screw in the bore, the screw having external and internal threads. A cylindrical body is within the internal threads, and the screw with the wall of the bore and with the cylindrical body forms, respectively, an external material flow chamber and an internal material flow chamber. The cylindrical body can have channels for heating fluid and for additives or dyes. The screw can have openings for feeding one material to a single extrusion head with one mouth by way of both chambers, or the chambers can be supplied with the same or different materials which are fed by way of the chambers to an extrusion head with two mouths for applying the latter materials separately.

14 Claims, 1 Drawing Sheet

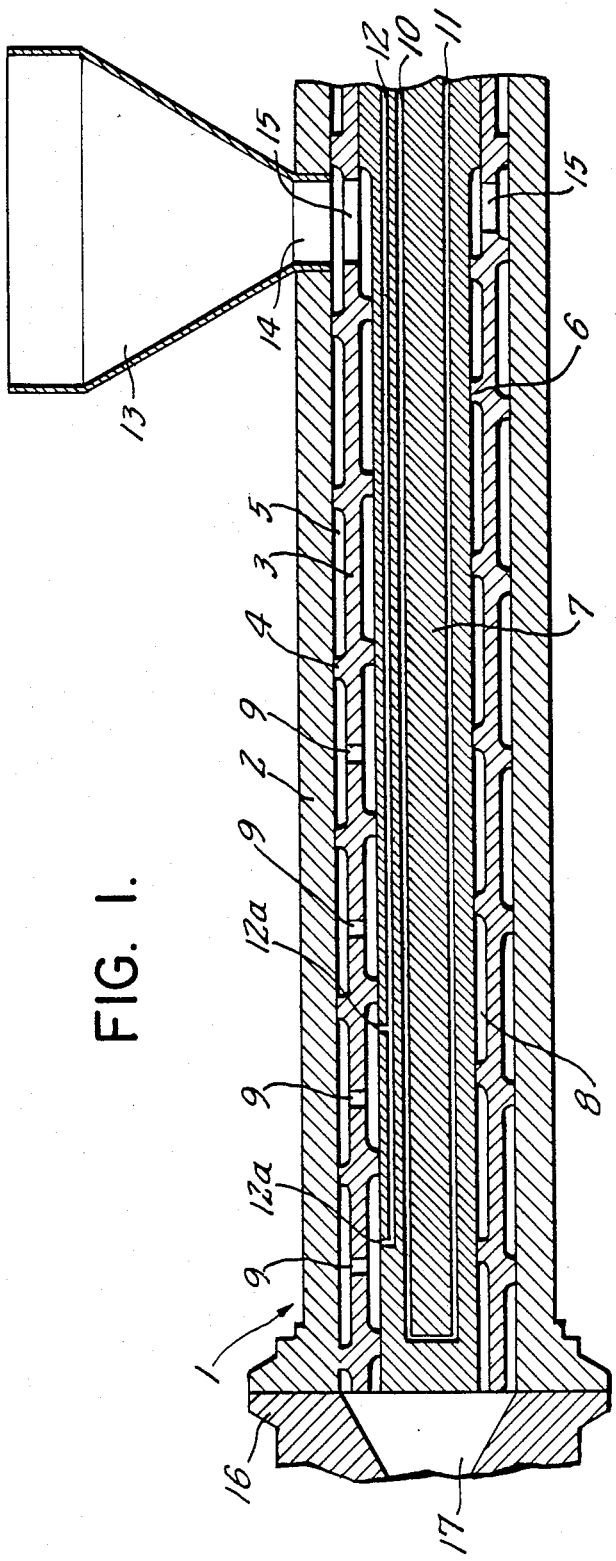
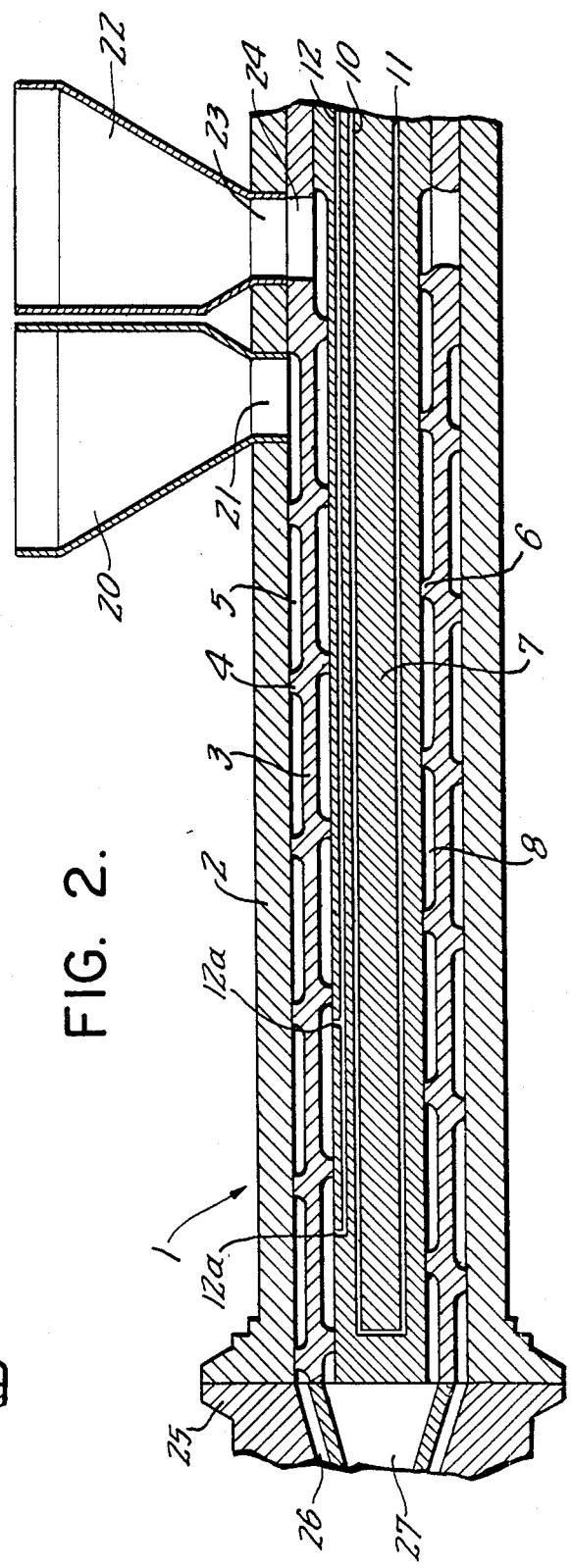

SCREW TYPE EXTRUDER WITH FLOW CHAMBERS EXTERNALLY AND INTERNALLY OF SCREW

The present invention relates to a single screw extruder for polymeric materials which can be cross-linkable or not cross-linkable and of an elastomeric or a non-elastomeric nature.

It is known that the extruders for polymeric materials are substantially composed of an external cylindrical envelope containing a screw, the rotation of which causes the advancement of the material to be extruder and supplied from the input end through a feeding hopper. The material must be compressed in a melted condition, the melting taking place by heating during the travel of the material from the feeding hopper to the extrusion head.

It is also known that extruders are characterized by their flow rate, namely, by the amount or volume of material they can extruder per unit of time.

The flow rate of the conventional extruders is substantially determined by the speed of rotation of the screw and by the area of the cross-section of the flow chamber defined between the inner surface of the cylindrical envelope and the outer surface of the screw.

Further, it is well known that the main problem concerning extruders is the relatively low flow rate thereof. A greater flow could be obtained by increasing the area of the cross-section of the flow chamber or by increasing the speed of rotation of the screw.

The area of the cross-section of the flow chamber could be increased by increasing the difference between the internal diameter of the external cylindrical envelope and the external diameter of the screw core, namely, the height of the screw threads, or, while leaving the height of the screw threads unchanged, by increasing simultaneously and to the same extent the two stated diameters.

However, the height of the screw threads cannot be increased beyond a certain limit because, over said limit, the granules of polymeric materials supplied by the feeding hopper can rotate upon themselves and would not be melted completely. On the other hand, it is not possible to increase indefinitely the diameters of the screw core and of the external envelope since, beyond a certain limit, even at a small speed of rotation of the screw, the peripheral speed of the screw threads with respect to the inner surface of the external cylindrical envelope would raise the temperature to such a point as to cause the deterioration by decomposition of the polymers or to cause the initial cross-linking in the cross-linkable materials.

It is not even possible to increase the speed of rotation of the screw beyond a certain limit as, in this case, the peripheral speed of rotation of the screw threads would have such a value as to cause again the drawbacks described hereinbefore.

To obtain higher flow rates of extruded material, two or more separate extruders joined to a single extrusion head have been used.

First of all, this arrangement does not solve the problem of increasing the flow rate of an extruder because the matereials extruded by several extruders are simply caused to flow together at a single point. Moreover, the overall dimensions of the machinery and its cost increase.

Another solution is that of using an extruder formed by an ovoidal tubular body in which two parallel screws act, the screw threads meshing with each other and cooperating in causing the advancement of the material.

In this way, the increased flow rate of the extruder is due to the greater hollow space available between the outer surface of the two parallel screws and the inner surface of the ovoidal envelope. The disadvantages of this solution are the bulk and the cost of the extruder, still high with respect to the extruders comprising only one screw, the difficult manufacture of the ovoidal tubular body, the critical fit between the threads of the two screws and the fact that the two parallel screws are not interchangeable with the single screw of the conventional extruders. In fact, whereas the two screws can be inserted only in an envelope of ovoidal section, the envelope of the conventional extruders comprising only one screw has a circular section.

Therefore, the present invention has, as one object, the overcoming of the above-indicated inconveniences and at providing a single screw extruder for polymeric materials which has a high flow rate, reduced costs and overall dimensions and comprises a screw which is interchangeable with that of the conventional extruders.

Accordingly, to achieve such object, the extruder for polymeric materials of the invention comprises an external cylindrical envelope and an internal screw provided on its outer surface with external threads, the inner surface of the cylindrical envelope and the outer surface of the screw defining an external flow chamber, characterized in that the screw also has an inner cavity on the wall of which there are helical ribs or internal threads and in that said cavity contains an internal cylindrical body, the inner surface of the hollow screw and the outer surface of the internal cylindrical body defining an internal flow chamber.

In a preferred embodiment, the two flow chambers are supplied by the same hopper and the hollow screw is provided with through holes which put the two flow chambers into communication in order to balance pressure and flow rate between them.

In an alternative embodiment, the two flow chambers are supplied by two hoppers with different materials and communication holes are not provided between them, so as to have distinct flows of material. Moreover, the extrusion head has two extrusion mouths corresponding to the two flow chambers. In this way, two layers of different materials are extruded.

Preferably, in each embodiment, the internal cylindrical body comprises channels for the thermal conditioning and for injecting additives and liquid dyes into the materials to be extruded.

Other objects and advantages of the present invention will be apparent from the following detailed description of the presently preferred embodiments thereof, which description should be considered in conjunction with the accompanying drawings in which:

FIG. 1 illustrates a fragmentary cross-section of an extruder according to a first embodiment of the invention; and FIG. 2 illustrates a fragmentary cross-section of an extruder according to a second embodiment of the invention.

In FIG. 1, the reference numeral 1 indicates an extruder formed by an external hollow cylindrical body 2 inside which there is a screw 3 provided with external threads 4 on its outer surface. The inner surface of the cylindrical body 2 and the outer surface of screw 3 define an external flow chamber 5.

Screw 3 is hollow. Its cavity has a cylindrical shape and has helical ribs or internal threads 6 on the inner surface of its wall. The internal threads 6 correspond to the external threads 4 and have the same sense and pitch as the latter, the word "sense" meaning that the internal threads 6 and the external threads 4 are both right-handed or both left-handed. This must not be considered as restrictive, since the external threads 4 and the internal threads 6 can be offset with respect to each other, can have a different shape, height and pitch and can have a variable pitch independently of each other.

An internal cylindrical body 7 is contained in the hollow screw 3 so that the outer surface of said internal cylindrical body 7 and the inner surface of the hollow screw 3 form an internal flow chamber 8.

The hollow screw 3 is provided with holes 9 so that the external flow chamber 5 and the internal flow chamber 8 are in mutual communication in order to balance and settle pressure and to provide flow between them.

The internal cylindrical body 7 comprises fluid flow channels or ducts 10 and 11 for the thermal conditioning of the internal portion of the extruder and a channel 12 connected at several points 12a to the internal flow chamber 8 for the possible addition of additives and/or liquid dyes in the material to be extruded.

The thermal conditioning of the external portion of extruder 1 takes place in a conventional way, and therefore, the thermal conditioning devices present in the external cylindrical envelope 2 have not been shown.

A feeding hopper 13 is situated at the back or input end of the extruder 1. The hopper, through a hole 14 in the external cylindrical body 2 and the connection slots 15 of the hollow screw 3, supplies granules of polymeric materials to both the external flow chamber 5 and the internal flow chamber 8 of the extruder 1.

The front part of extruder 1 comprises an extrusion head 16 provided with an extrusion mouth 17.

In operation, the external cylindrical body 2 and the internal cylindrical body 7 are kept stationary while the hollow screw 3 is rotated. In this way, the granules of polymeric materials fed from the hopper 13 through the hole 14 and slots 15 are brought towards the extrusion had 16 and at the same time, they are melted both in the external flow chamber 5 and in the internal flow chamber 8.

In the extruder represented in FIG. 2, in which the elements which are the same as elements shown in FIG. 1 are indicated with the same reference numerals, the external flow chamber 5 and the internal flow chamber 8 are not in mutual communication.

Further, the extruder comprises in its back part a first feeding hopper 20 which, through a hole 21 in the external cylindrical body 2, feeds the external flow chamber 5 with a first material and, after the first hopper 20, a second feeding hopper 22 which, through a hole 23 obtained in the external cylindrical body 2 and slots 24 of the hollow screw 3, feeds the internal flow chamber 8 with a second material.

The extruder, at its front part, comprises an extrusion head 25 with two extrusion mouths 26 and 27 arranged in such a way that the extrusion mouth 26 corresponds to the external flow chamber 5 and the extrusion mouth 27 corresponds to the internal flow chamber 8.

In operation, the external flow chamber 5, through hole 21, is fed by the hopper 20 with granules of a first material to be extruded, whereas the internal flow chamber 8, through the hole 23 and the slots 24, is fed by the hopper 22 with granules of a second material to be extruded.

The first and the second materials follow separate runs and reach respectively the extrusion mouths 26 and 27 of the extrusion head 25.

In this way, the extruder allows the production of an extruded element formed by two layers of different materials. In particular, it is useful, for example, to cover electric cables with a first layer of a first insulating material and then, with a second insulating layer consistent with the first but having better characteristics with respect to appearance, finishing and peeling, in order to obtain an electric cable with good properties and low cost.

Moreover, it is known that, with equal thickness of the insulating covering, the insulation of electric cables is improved if the covering is made of two distinct layers of the same material.

This improvement is due to the fact that, by reducing the thickness of the single insulating layers, the size of the possible irregularities which may be present in the individual layers are reduced, and it is quite unlikely for two irregularities to be present in the two layers aligned along the same radius of the cable.

To obtain the two layers of the same material, it is sufficient to feed the two hoppers 20 and 22 shown in FIG. 2 with the same material or to replace in the extruder of FIG. 1 the extrusion head 16 having a single extrusion mouth 17 with the extrusion head 25 of FIG. 2 having two extrusion mouths 26 and 27.

From the foregoing description, it is clear that the extruder according to the present invention attains the objects which it intended to achieve. In fact, this extruder, which utilizes only one screw and consequently has the same overall dimensions as the extruders comprising only one flow chamber, has a flow rate which is considerably higher (60-70% more) with respect to one chamber extruder. This is obtained by exploiting a portion of the screw until now disregarded, namely, its internal portion, in which a second flow chamber is created by the provision of a hollow screw.

Further, the extruder according to the invention allows the manufacture of an extruded element formed by two distinct layers of the same material or of different materials, without making use of two extruders, as in the conventional techniques.

Also, the channels for the thermal conditioning, provided in the internal cylindrical body, which permit an accurate adjustment of the working temperature of the internal flow chamber, and the holes of the hollow screw, which ensure a correct balance between the pressure and the flow in the two flow chambers, lead to the production of an extruded material which has at least the same quality as those obtained by means of the conventional extruders.

Finally, as the hollow screw has the same outer shape and the same size as the conventional screws, it is interchangeable with the latter, so that the flow rate of the conventional extruders can be considerably increased by simply replacing the solid screws thereof with the hollow screw and the cylindrical body according to the invention.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An extruder or polymeric materials, said extruder comprising:
    an outer elongated stationary body having a cylindrical bore defined by an inner wall;
    an elongated hollow and rotatable screw with an exterior surface and an inner wall, said screw being disposed within said bore and extending from a first portion of said cylindrical bore to a second portion of said cylindrical bore, said screw having first threads of a first sense extending radially outwardly from the exterior surface thereof, said wall of said cylindrical bore and said exterior surface of said screw defining an external material flow chamber, and said screw having a passageway internally thereof defined by said inner wall of said screw and extending from a first portion of said cylindrical bore to a second portion of said cylindrical bore, said screw having second threads extending radially inwardly from said inner wall of said screw and said second threads having the same sense as said first threads;
    an inner stationary cylindrical body disposed within said passageway and having an exterior surface adjacent said second threads to define an internal material flow chamber between said inner wall of said screw and the exterior surface of said cylindrical body extending from said first portion to said second portion of said cylindrical bore; and
    means for supplying a polymeric material to said first portion of said cylindrical bore;
    whereby said rotatable screw with said first threads and said second threads acting respectively in conjunction with said inner wall of said outer stationary elongated body and in conjunction with said exterior surface of said inner stationary cylindrical body provides a high flow rate of polymeric material supplied to said first portion of said cylindrical bore to said second portion of said cylindrical bore without increasing the temperature of the polymeric material to a value which causes deterioration of the polymeric material.

2. An extruder as set forth in claim 1 wherein said first threads and said second threads are radially aligned.

3. An extruder as set forth in claim 1 wherein said first threads are offset with respect to said second threads in the axial direction of said cylindrical bore.

4. An extruder as set forth in claim 1 wherein said first threads and said second threads have the same pitch.

5. An extruder as set forth in claim 1 wherein said first threads and said second threads have different pitches.

6. An extruder as set forth in claim 1 wherein at least one of said first threads and said second threads has a variable pitch.

7. An extruder as set forth in claim 1 wherein the height of said first threads is different from the height of said second threads.

8. An extruder as set forth in claim 1 wherein said screw has radial openings therein extending from said internal material flow chamber to said external material flow chamber.

9. An extruder as set forth in claim 1 wherein said inner stationary cylindrical body has longitudinal extending, fluid flow channels therein for receiving a fluid.

10. An extruder as set forth in claim 1 wherein said inner stationary cylindrical body has a longitudinal material flow channel and at least one opening extending from said longitudinal material flow channel to said internal material flow chamber for the supply of additives and dyes to said material flow chamber.

11. An extruder as set forth in claim 1 wherein said means for supplying a polymeric material to said bore comprises a hopper connected to said outer elongated stationary body at said first portion of said bore, said outer elongated stationary body and said screw having openings therethrough at said hopper for the passage of polymeric material from said hopper into said external material flow chamber and into said internal material flow chamber.

12. An extruder as set forth in claim 1, wherein said means for supplying polymeric material to said bore comprises a first polymeric feeding hopper and a second polymeric feeding hopper connected to said elongated body at said first portion of said bore, said outer elongated stationary body having a first opening therethrough at said first hopper for the passage of polymeric material from said first hopper into said external material flow chamber and said elongated body having a second opening therethrough and said screw having an opening therethrough at said second hopper for the passage of polymeric material from said second hopper into said internal material flow chamber.

13. An extruder as set forth in claim 1 further comprising an extrusion head at said second portion of said bore, said extrusion head having a mouth aligned with said external material flow chamber and said internal material flow chamber for receiving material from each said chamber.

14. An extruder as set forth in claim 1 further comprising an extrusion head at said second portion of said bore, said extrusion head comprising a first mouth aligned with said internal material flow chamber for receiving material from said internal material flow chamber and a second mouth radially outwardly of said first mouth and aligned with said external material flow chamber for receiving material from said external material flow chamber.

* * * * *